(12) United States Patent
Carmel et al.

(10) Patent No.: US 6,397,230 B1
(45) Date of Patent: May 28, 2002

(54) REAL-TIME MULTIMEDIA TRANSMISSION

(75) Inventors: Sharon Carmel; Tzur Daboosh, both of Givataim; Eli Reifman, Rishon le Zion; Naftali Shani, Tel Aviv, all of (IL)

(73) Assignee: Geo Interactive Media Group, Ltd., Givataim (IL)

( * ) Notice: Subject to any disclaimer, the term of this patent is extended or adjusted under 35 U.S.C. 154(b) by 0 days.

(21) Appl. No.: 08/919,027

(22) Filed: Aug. 27, 1997

Related U.S. Application Data

(63) Continuation-in-part of application No. 08/594,890, filed on Feb. 9, 1996, now Pat. No. 5,841,432.

(51) Int. Cl.[7] .................................................. G09G 5/12
(52) U.S. Cl. ...................... 707/500.1; 709/231; 709/247
(58) Field of Search ........................ 707/500.1; 341/67; 709/217–219, 231, 235, 246, 247; 382/232, 233; 345/716, 719–723; 348/14.12, 14.13, 384.1; 725/95–96

(56) References Cited

U.S. PATENT DOCUMENTS

| | | | | |
|---|---|---|---|---|
| 5,265,206 A | * | 11/1993 | Shackelford et al. | 709/316 |
| 5,291,286 A | * | 3/1994 | Murakami et al. | 348/469 |
| 5,483,287 A | | 1/1996 | Siracusa | 348/426 |
| 5,493,638 A | | 2/1996 | Hooper et al. | 395/135 |
| 5,517,652 A | | 5/1996 | Miyamoto et al. | 395/800 |
| 5,519,828 A | | 5/1996 | Rayner | 395/161 |
| 5,537,528 A | | 7/1996 | Takahashi et al. | 395/154 |
| 5,590,262 A | | 12/1996 | Isadore-Barreca | 395/806 |
| 5,610,841 A | | 3/1997 | Tanaka et al. | 364/514 |
| 5,619,636 A | | 4/1997 | Sweat et al. | 395/806 |
| 5,675,332 A | * | 10/1997 | Limberg | 341/65 |
| 5,694,334 A | | 12/1997 | Donahue et al. | 364/514 |
| 5,708,845 A | | 1/1998 | Wistendahl et al. | 395/806 |
| 5,907,659 A | * | 5/1999 | Yamauchi et al. | 386/125 |
| 6,061,731 A | * | 5/2000 | Blakeslee | 709/231 |

OTHER PUBLICATIONS

CorelDRAW User's Manual–Version 4.0, 1993, pp. 413–455.

* cited by examiner

*Primary Examiner*—Joseph H. Feild
(74) *Attorney, Agent, or Firm*—Ladas & Parry

(57) ABSTRACT

A method for conveying a multimedia sequence from a source computer to a destination computer, including, providing an ordered series of data frames at the source computer, each data frame corresponding to an image in the sequence and including data representing one or more media associated with the image, producing a table including pointers, each pointer associated with one frame in the series, transmitting the table to the destination computer, and responsive to selection of one of the pointers in the table, transmitting at least a sub-series of the series of data frames, said sub-series beginning with the frame with which the selected one of the pointers is associated.

38 Claims, 10 Drawing Sheets

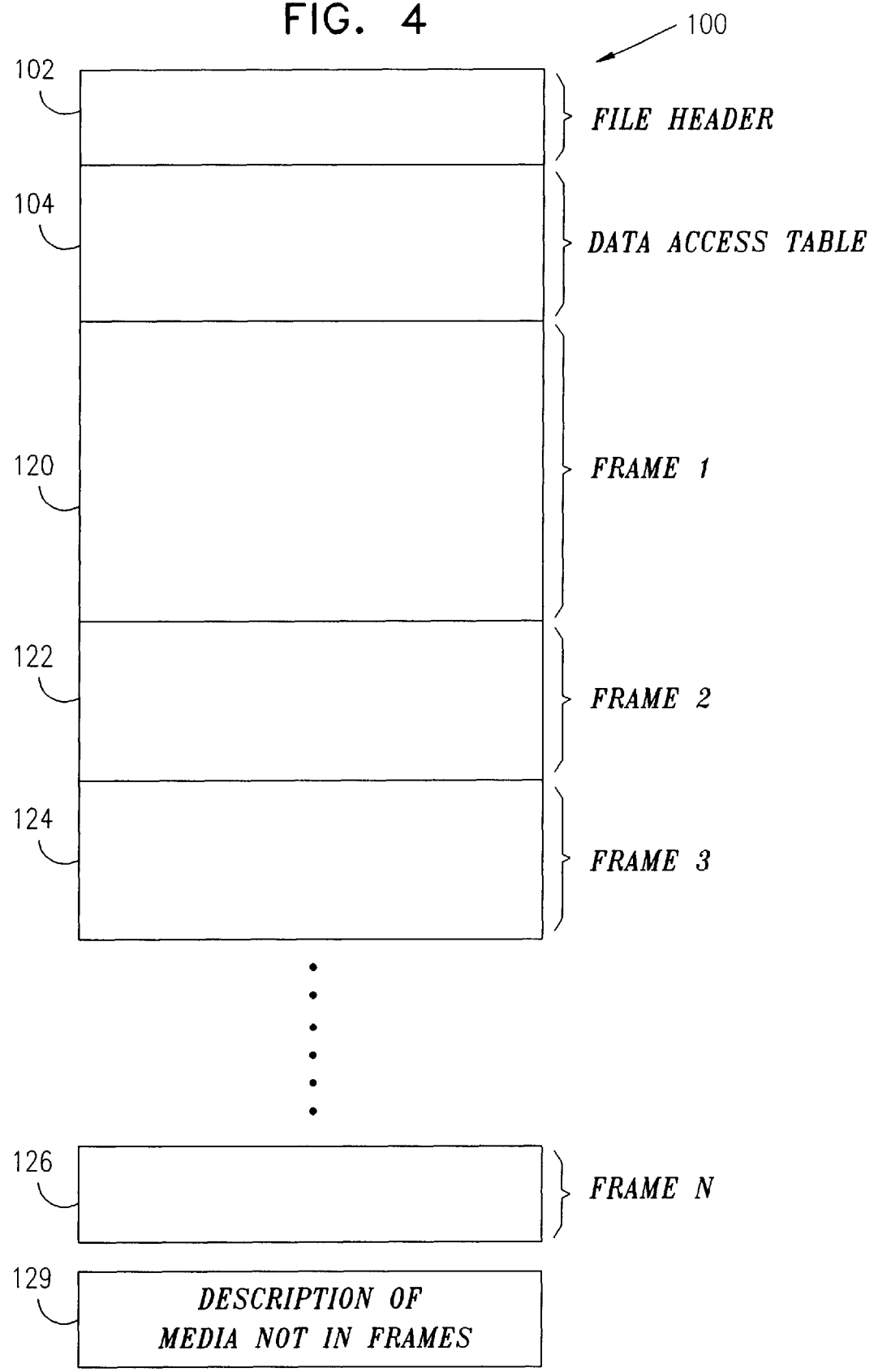

REAL-TIME MULTIMEDIA TRANSMISSION

RELATED APPLICATIONS

This application is a Continuation-in-Part of U.S. patent application Ser. No. 08/594,890, now U.S. Pat. No. 5,841, 432, which is assigned to the assignee of the present patent application filed Feb. 9, 1996 and whose disclosure is incorporated herein by reference.

FIELD OF THE INVENTION

The present invention relates generally to data transmission, and particularly to fast transmission of large multimedia files.

BACKGROUND OF THE INVENTION

The advent of powerful computers and large storage disks, such as CD-ROMs, in recent years, has brought with it a surge in production and use of sophisticated multimedia applications, including full length video movies, interactive sound and animation.

In recent years with the growth in Internet use, multimedia applications have been transferred to Internet web sites. However, most Internet users are connected to the web through public telephone lines, which have a slow average rate of data transfer, commonly referred to as bandwidth, typically about 1–3 Kbyte/second. Therefore, when these users connect to web sites that include large multimedia applications, they must wait long periods until they can view the contents of the site. The result is that sites must often limit their non-text contents to, at most, a few still images.

In order to reduce the amount of time required for transmission of multimedia applications, attempts are made to reduce the amount of data transmitted by the applications. Various compression methods are used to minimize the amount of data which is to be transferred.

Such compression methods include the well-known JPEG and MPEG standards, which are described, for example, in ISO/IEC WG11 N0501, July 1993, published by the International Standards Organization, and in "JPEG Still Data Compression Standard", William B. Pennebaker and Joan L. Mitchell, Van Nostrand Reinhold, New York, which are incorporated herein by reference. However, even with these compression methods, current multimedia applications require a data transfer rate of about 50–150 Kbytes/second to provide true real-time multimedia. Also, more sophisticated compression methods may require complex decompression software packages and special-purpose CPUs, which are not available to most users.

SUMMARY OF THE INVENTION

It is an object of some aspects of the present invention to provide improved methods of multimedia data organization, to allow fast data transfer of multimedia applications.

It is another object of some aspects of the present invention to provide apparatus and methods for development of multimedia applications for Internet users.

It is yet another object of some aspects of the present invention to provide improved methods for compressing images and data for transmission and storage.

It is a further object of some aspects of the present invention to provide apparatus and methods for developing multimedia applications suitable for transfer at a predetermined bandwidth.

It is still a further object of some aspects of the present invention to provide methods for estimating the size and transfer rate of a multimedia application.

In some aspects of the present invention, multimedia information is organized in a file for transmission, such that a recipient may randomly access parts of the file, and there is no need to transmit the whole file sequentially.

In some preferred embodiments of the present invention, a transmitting computer organizes the multimedia information in frames, each frame corresponding to a portion of the information to be presented at a given point in time. A file containing the information includes a sequential listing of the data forming each frame and a direct access table, which contains an ID for each frame and one or more pointers to the data in the frame. The frames are preferably organized in the file sequentially according to the order in which the frames are likely to be displayed, and the table is preferably placed at the beginning of the file.

When the recipient accesses the file, the access table is transmitted initially, and the recipient may then request transmission of any desired frame or sequence of frames in the file. Preferably, for this purpose, as soon as the table and an initial frame in the file have been received, the recipient's computer displays an image of the initial frame including one or more "hot spots," as are known in the art, which are linked to invoke corresponding frame IDs or pointers in the table. Each frame is preferably displayed as it arrives at the recipient's computer, without waiting for the entire file. Thus, after the initial frame has been received and displayed, the recipient will generally be able to view a continuous stream of multimedia images, without having to wait for the entire multimedia file to download to his computer as in applications known in the art.

Preferably, each received frame is stored in a memory of the recipient's computer for further access. Thus, if a frame or parts of a frame appear or are invoked by a user twice or more in an application, there is no need to transmit the frame or parts a second time. Rather, the frame is accessed in the memory according to the access table. Preferably, the frames are stored as they are received in a compressed format and are decompressed when required. Alternatively or additionally, the frames are stored in a non-compressed format, which is ready for immediate display.

Preferably, the size of the table is dynamically adjusted according to the size of the file, and the data size of the pointers in the table is chosen according to the size of the file. Preferably, in a file smaller than 256 bytes, the pointers are one byte long, in a larger file which is smaller than 64K the pointers are two bytes long, etc.

Preferably, based on the table the recipient computer does not need to continuously check for a file delimiter, but rather counts the frames received until their number matches the number of frames in the table. Alternatively, the number of frames and/or the length of the file is specifically stated in a header of the file. In addition, according to the difference between the pointers of two consecutive frames, the size of the first frame is known, and there is no need to have a delimiter after the information of each frame.

In some aspects of the present invention, the data of the frames, and/or other multimedia information, are stored in a compact form so as to reduce the size of the file. In preferred embodiments of the present invention, the size of multimedia files may be reduced in over 90%, and on the average at a ratio of about 1:80. Such compression rates allow fast transmission of the information over relatively slow communication channels.

In a preferred embodiment of the present invention, each frame comprises a number of separate layers which when displayed or otherwise actuated together form the frame.

These layers include one or more media which carry visual or audio information in any suitable format, preferably in standard formats known in the art. Each of the media comprises any number of primary objects, such as vectors or bitmaps, which form the media. Preferably, the table includes pointers to each of the media in the file. Identical media which appear in more than one frame are kept in the file only in the first frame in which they appear. In the rest of the frames they are referred to by an ID code and coordinates. When reading the file, the recipient computer will refer to the table to find the addresses of the media. Alternatively, the media may be referenced directly by a pointer to their position in the file.

In preferred embodiments of the present invention, coordinates used in identifying the locations of visual elements, layers, visual media and visual objects, are dynamically sized according to the range of pixels over which the element may move. An element having positions up to 256 pixels preferably uses one byte coordinates, while elements having up to 64K possible positions use two byte coordinates. In elements having a very large range, three byte coordinates may also be employed. Alternatively or additionally, other sizes such as half bytes and 12-bit coordinates may be used for specifying coordinates in elements of appropriate size. Such adaptively-sized coordinates are useful in reducing the volume of data that must be transmitted and in increasing the speed with which the media are processed and displayed by the recipient computer.

Preferably, the coordinates of each element are stated with respect to the region in which the element may be positioned rather than to the view of the entire frame. For example, the coordinates of objects in one of the media may be specified relative to the top left corner (or any other suitable point) of a region in the frame occupied by the medium, and the medium is positioned within the frame according to the coordinates of the top left corner of the region that it occupies relative to the frame. It is noted that most media are relatively small, and therefore the savings of storage space in using dynamic-sized coordinates is typically close to 50%. Preferably, in choosing coordinate systems for media which do not occupy the entire frame, the coordinate system is chosen such that the data volume of the coordinates is small. For example, a coordinate system having up to 256 pixels is preferably chosen such that the coordinates occupy only one byte.

In preferred embodiments of the present invention, each object and/or medium has a dynamically sized property list. In prior art methods, each object has a property list of fixed length, which may either contain properties which are usually not used, and therefore waste memory and/or transmission bandwidth, or contain very few properties and thus limits the flexibility of the user in defining properties.

Preferably, the property list is divided into blocks according to the complexity and/or frequency of occurrence of the properties. A first block includes those properties which are defined for every object. A second block includes properties which are used commonly but not always. Further blocks include properties which are used more seldom in reducing occurrence. Preferably, the properties in the more seldom blocks are required only if the properties in the more frequent blocks are used. At the end of each block there is a flag which signals whether there are further property blocks for the object. Thus, the size of the property list is dynamically sized according to the properties in use.

Alternatively or additionally, the property list is ordered dynamically according to the occurrence of given properties in the file. Those properties which are altered or differ most often from one object to another are positioned at the top of the list, while those used seldom are positioned at the bottom of the list. The property list of each object is truncated of properties which are not defined, and therefore their values are set according to a predetermined default. The property list is preferably terminated by a termination code, or alternatively, the number of entries in the list is stated before the list. Alternatively, each property in the list is accompanied by its definition, and only those properties having values different from the default are listed.

In some preferred embodiments of the present invention, media comprising bitmaps are compressed in order to reduce the memory required. Preferably, the bitmap is first filtered using a low-pass blur filter, and a compression transform operation, such as a discrete cosine transform (DCT), preferably in accordance with the JPEG standard mentioned above, is then applied to the filtered bitmap. When such bitmaps are to be transmitted over the Internet, it has been found that filtering the bitmap before applying the transform results in reduction of the required memory and/or bandwidth required to store or transmit the bitmap by about 2–4 times, substantially without loss of image quality, relative to conventional JPEG transformed bitmaps. Preferably, the user may define areas which are not to be filtered and/or areas which may undergo stronger filtering.

In some preferred embodiments of the present invention, a multimedia authoring tool primarily designed for Internet applications allows a user to conveniently create multimedia applications on a source computer, particularly for transmission over the Internet. The authoring tool preferably allows easy creation of web sites and automatic translation and compression of multimedia applications to a form suitable for real-time display by recipient sites, as described above. Preferably, at any desired time during the creation of the application, the user of the authoring tool may receive an estimate of the transmission rate required for smooth real-time appearance of a multimedia application, based on the data content and predicted compression ratio of the frames in the application. Thus, there is no need to perform a time-consuming full compression of a multimedia application in order to receive a good estimate of the required transmission rate. Also, use of the estimate allows more efficient compression of the file by knowledge of the resulting file size.

In a preferred embodiment of the present invention, a multimedia software development tool performs an estimate of the memory required for each object. Bitmaps are estimated according to estimates of the required memory based on statistical samplings of the bitmaps.

In some preferred embodiments of the present invention, the user defines a required transmission rate or bandwidth for a multimedia application, and the file representing the application is automatically compressed according to the transmission rate or bandwidth. In order to create an application that can be transmitted at a low transmission rate or narrow bandwidth, strong compression is used, at the cost of image sharpness, while for higher transmission rates, better sharpness is achieved. In authoring and compression tools known in the art, the user must generally specify desired compression parameters, and can determine whether the file compression accordingly achieved is sufficient to match the available bandwidth only by trial and error. The present invention enables the user to specify the available bandwidth and a frame rate, whereupon the required compression parameters are automatically determined by the source computer based on statistical estimation of the compression ratio and pre-calculation of the file size.

Preferably, a recipient connecting to a site created using the authoring tool of the present invention receives upon entering the site a software applet for decompressing the data. Preferably, the transmission time of the applet is typically less than fifteen seconds, more preferably less than ten seconds.

In some preferred embodiments of the present invention, an initial frame, including images or menus for invoking selected parts of the application, is transmitted to the recipient upon entering the site. The recipient may then request a specific part of the file, which is immediately transmitted upon request. If no request is made, the file is transmitted sequentially as described above, until such a request is made, or until the entire file is transmitted.

It is noted that the compression methods of preferred embodiments of the present invention are simple to implement and are especially easy for decompression. The simplicity of decompression ensures that a receiving computer does not require heavy CPU use for decompression resulting in slow performance of the computer in displaying the multimedia application.

There is therefore provided in accordance with a preferred embodiment of the present invention, a method for conveying a multimedia sequence from a source computer to a destination computer, including:

providing an ordered series of data frames at the source computer, each data frame corresponding to an image in the sequence and including data representing one or more media associated with the image;

producing a table including pointers, each pointer associated with one frame in the series;

transmitting the table to the destination computer; and responsive to selection of one of the pointers in the table, transmitting at least a sub-series of the series of data frames, said sub-series beginning with the frame with which the selected one of the pointers is associated.

Preferably, producing the table includes defining pointers having a data size normalized to the size of a data file containing the series of frames.

Preferably, defining the pointers includes defining pointers of a minimal size required to distinctly address every frame in the file.

Preferably, defining the pointers includes defining one-byte pointers when the ordered series includes less than 256 bytes.

Preferably, defining the pointers includes defining two-byte pointers when the ordered series includes less than 65,536 bytes.

Preferably, the method also includes transmitting at least an initial frame in the series to the destination computer and associating one or more of the pointers in the table with the initial frame, wherein transmitting the sub-series includes transmitting the sub-series responsive to a selection made with respect to the initial frame.

Preferably, producing the table includes producing pointers which indicate respective media in one or more of the frames.

Preferably, transmitting the sub-series responsive to selection includes invoking the media indicated by a selected pointer.

Preferably, providing an ordered series of frames includes creating a first frame including data representing an object in the corresponding image.

Preferably, providing the ordered series includes creating additional frames after the first frame, which include frame data indicative of the coordinates of the object.

Preferably, creating the additional frames includes creating additional frames which include a pointer to data representing the object in the first frame.

Preferably, creating the additional frames includes creating additional frames which include an ID corresponding in the table to a pointer to the data representing the object in the first frame.

Preferably, transmitting the table includes transmitting over a computer network.

Preferably, transmitting the table includes transmitting over the Internet.

Preferably, the method also includes transmitting to the destination computer a JAVA applet operative to produce sensible material from the ordered series.

Preferably, creating the series includes creating data objects representing audio data.

Alternatively or additionally, creating the series includes creating data objects representing visual data.

Alternatively or additionally, creating the data objects includes creating at least some segments which include vector objects.

Alternatively or additionally, creating the data objects includes creating at least some segments which include compressed bitmaps.

Preferably, providing the ordered series of data frames includes creating coordinates of objects within the frame, relative to sub-elements of the frame, wherein creating coordinates of objects includes normalizing the data size of the coordinates responsive to pixel dimensions of the sub-elements.

There is also provided in accordance with a preferred embodiment of the present invention, a method for conveying a multimedia sequence from a source computer to a destination computer, including creating a series of data frames at the source computer, each frame corresponding to an image in the sequence, and the series including coordinates of objects within sub-elements of the frames, wherein for each coordinate a data size of the coordinate is normalized responsive to pixel dimensions of the sub-element, and transmitting at least one of the data segments to the destination computer, wherein the segments are displayed responsive to the coordinates.

Preferably, normalizing the data size of the coordinates includes normalizing the data size responsive to pixel dimensions of a layer in the frame.

Alternatively or additionally, normalizing the data size of the coordinates includes normalizing the data size responsive to pixel dimensions of an object.

There is further provided in accordance with a preferred embodiment of the present invention, a method for displaying an image sequence on a computer display, including:

choosing a coordinate system having desired dimensions for at least some of the images in the sequence;

defining a medium to appear in the at least some of the images;

setting position coordinates of the medium in the image, the coordinates having a data size that is normalized to the dimensions of the coordinate system; and displaying the at least some of the images on the computer display, by rendering the object at the position coordinates thereof.

Preferably, choosing the coordinate system includes choosing a coordinate system having a number of pixels such that the data size required for addressing any point in the system is substantially minimized.

Preferably, choosing the coordinate system includes choosing a coordinate system having up to 256 pixels.

Preferably, choosing the coordinate system includes choosing a coordinate system smaller than at least one of the images.

Preferably, displaying the at least some of the images includes creating and transmitting a data file including the object and the position coordinates from a source computer to a destination computer, where the at least some of the images are displayed.

There is further provided in accordance with a preferred embodiment of the present invention, a method of transmitting image data from a source computer to a destination computer, including low-pass filtering the image data, compressing the data according to a block-compression method, and transmitting the compressed data to the destination computer.

Alternatively, the method includes storing the compressed data in the storage medium.

Preferably, compressing the data includes compressing the data using a JPEG compression algorithm.

Preferably, low-pass filtering includes convolving the image data with a blur filter kernel.

There is further provided in accordance with a preferred embodiment of the present invention, a method of transmitting a multimedia sequence from a source computer to a destination, including providing an ordered series of data frames at the source computer, the series having a predetermined frame rate, indicating a bandwidth at which the series of data frames is to be transmitted, compressing the data frames at a compression ratio determined responsive to the indicated bandwidth and the predetermined frame rate, and transmitting the compressed frames.

Preferably, providing the series includes creating the series responsive to the indicated bandwidth.

Preferably, providing the series includes importing the series from another computer.

Preferably, providing the series of data frames includes receiving a series of data frames having a predetermined data size, and wherein compressing the data frames includes compressing the data at a compression ratio generally equal to or less than a ratio of the indicated bandwidth to a product of the frame data size times the frame rate.

Preferably, compressing the data frames includes selecting a desired compression ratio, and estimating the bandwidth that will be required to transmit the frames compressed at the desired compression ratio, in comparison to the indicated bandwidth.

Preferably, estimating the bandwidth includes displaying a graphical comparison of the estimated and indicated bandwidths over time.

Preferably, transmitting the compressed frames includes transmitting at least a portion of a frame before a respective time slot thereof when it is estimated that the required transmission bandwidth exceeds the indicated bandwidth during the time slot.

Preferably, estimating the bandwidth includes calculating an estimate without compressing the data frames.

Preferably, compressing the data frames includes setting coefficients for compressing bitmap images to achieve the determined compression ratio.

Preferably, compressing the data frames includes normalizing the data size of coordinates of objects in the frames.

Preferably, compressing the data frames includes storing in a file containing the frame sequence only one description of each of the media in the data frames.

Preferably, estimating the bandwidth includes statistically sampling the media in the frames.

There is further provided in accordance with a preferred embodiment of the present invention, a method of displaying an estimate of the bandwidth required for transmitting a multimedia sequence over a network, including:

providing an ordered series of data frames having a predetermined frame rate;

estimating the bandwidth that will be required to transmit the frames when compressed according to a predetermined compression scheme; and displaying on a computer display the estimate of the required bandwidth.

Preferably, estimating the bandwidth includes displaying a graphical comparison over time of the estimated bandwidth and an indicated bandwidth characteristic of the network.

Preferably, estimating the bandwidth includes subtracting from the estimate of a first frame the difference between the bandwidth of a second preceding frame and the indicated bandwidth.

Preferably, estimating the bandwidth includes calculating an estimate without compressing the data frames.

Preferably, estimating the bandwidth includes statistically sampling media in the frames.

Preferably, estimating the bandwidth includes adding to the estimate of a first frame the bandwidth of a medium referenced in the first frame but not described therein.

Preferably the method includes altering at least one of the data frames responsive to the estimate.

Preferably the method includes compressing the data frames responsive to the estimate.

Preferably the method includes storing the compressed data frames.

Alternatively or additionally, the method includes transmitting the compressed data frames.

There is further provided in accordance with a preferred embodiment of the present invention, apparatus for conveying a multimedia sequence over a network to a destination computer, including:

a media processor, coupled to the network, which provides an ordered series of data frames, each frame corresponding to an image in the sequence, and produces a table including pointers, each pointer respectively associated with one frame in the series, wherein the processor transmits the table to the destination computer and responsive to selection of one of the pointers in the table, transmits at least a sub-series of the ordered series of data frames, said sub-series beginning with the frame with which the selected one of the pointers is associated.

Preferably, the pointers have a data size normalized to the size of a data file containing the series of frames.

Preferably, the pointers have a minimal size required to distinctly address every frame in the file.

Preferably, the pointers have a size of one-byte when the ordered series includes less than 256 bytes.

Preferably, the pointers have a size of two bytes when the ordered series includes less than 65,536 bytes.

Preferably, the processor transmits at least an initial frame in the series to the destination computer and transmits the sub-series responsive to a selection made with respect to the initial frame.

Preferably, the table includes pointers which indicate respective media in one or more of the frames.

Preferably, the processor transmits the sub-series responsive to invoking the media indicated by a selected pointer.

Preferably, the ordered series of frames includes a first frame including data representing an object in the corresponding image and additional frames after the first frame, which include frame data indicative of the coordinates of the object.

Preferably, the data indicative of the description of the object includes a pointer to data representing the object in the first frame.

Preferably, the data indicative of the description of the object includes an ID corresponding in the table to a pointer to the data representing the object in the first frame.

Preferably, the network includes the Internet.

Preferably, the processor transmits to the destination computer a JAVA applet operative to produce sensible material from the ordered series.

Preferably, the series includes data objects representing audio data.

Alternatively or additionally, the series includes data objects representing visual data.

Preferably, the data objects include at least some segments which include vector objects.

Preferably, the data objects include at least some segments which include compressed bitmaps.

Preferably, the ordered series of data frames includes coordinates of objects within the frame, relative to sub-elements of the frame, and wherein the data size of the coordinates of the objects are normalized responsive to pixel dimensions of the sub-elements.

There is further provided in accordance with a preferred embodiment of the present invention, apparatus for conveying a multimedia sequence over a network to a destination computer, including a media processor, coupled to the network, which provides an ordered series of data frames, each frame corresponding to an image in the sequence, and produces a series of data segments including coordinates of objects within sub-elements of the frames, wherein for each coordinate a data size of the coordinate is normalized responsive to pixel dimensions of the sub-element, wherein the processor transmits at least one of the data segments to the destination computer, wherein the segments are displayed responsive to the coordinates.

Preferably, the data size of the coordinates is normalized responsive to pixel dimensions of a layer in the frame.

Alternatively or additionally, the data size of the coordinates is normalized responsive to pixel dimensions of an object.

There is further provided in accordance with a preferred embodiment of the present invention, apparatus for displaying an image sequence on a computer display, including a media processor, which chooses a coordinate system having desired dimensions for at least some of the images in the sequence, and defines a medium to appear in the at least some of the images, wherein the processor sets position coordinates of the medium in the image, the coordinates having a data size that is normalized to the dimensions of the coordinate system, and a screen for displaying the at least some of the images, by rendering the object at the position coordinates thereof.

Preferably, the processor chooses the coordinate system such that the data size required for addressing any point in the system is substantially minimized.

Preferably, the coordinate system has up to 256 pixels.

Preferably, the coordinate system is smaller than at least one of the images.

There is further provided in accordance with a preferred embodiment of the present invention, apparatus for transmitting image data from a source computer to a destination computer, including a media processor which performs low-pass filtering on the image data, and compresses the data according to a block-compression method, wherein the processor transmits the compressed data to the destination computer.

There is further provided in accordance with a preferred embodiment of the present invention, apparatus for storing image data, including a media processor which performs low-pass filtering on the image data, and compresses the data according to a block-compression method and a memory unit for storing the compressed data therein.

Preferably, the processor compresses the data using a JPEG compression algorithm.

Preferably, the processor performs low-pass filtering by convolving the image data with a blur filter kernel.

There is further provided in accordance with a preferred embodiment of the present invention, apparatus for transmitting a multimedia sequence over a network to a destination computer, including a media processor, which provides an ordered series of data frames having a predetermined frame rate and indicates a bandwidth at which the series of data frames is to be transmitted, wherein the processor compresses the data frames at a compression ratio determined responsive to the indicated bandwidth and the predetermined frame rate and transmits the compressed frames.

Preferably, the series of data frames has a predetermined data size, and the data frames are compressed at a compression ratio generally equal to or less than a ratio of the indicated bandwidth to a product of the frame data size times the frame rate.

Preferably, the processor receives a desired compression ratio, and estimates the bandwidth that will be required to transmit the frames compressed at the desired compression ratio, in comparison to the indicated bandwidth.

Preferably, the apparatus includes a display on which the processor displays a graphical comparison of the estimated and indicated bandwidths over time.

Preferably, each frame is allocated a respective time slot and the processor transmits at least a portion of a frame before its respective time slot when it is estimated that the estimated bandwidth exceeds the indicated bandwidth during the time slot.

Preferably, the processor estimates the bandwidth without compressing the data frames.

Preferably, the processor sets coefficients for compressing bitmap images to achieve the determined compression ratio.

Preferably, the processor normalizes the data size of coordinates of objects in the frames.

There is further provided in accordance with a preferred embodiment of the present invention, apparatus for displaying an estimate of the bandwidth required for transmitting a multimedia sequence over a network, including, a media processor, which provides an ordered series of data frames having a predetermined frame rate, and produces an estimate of the bandwidth that will be required to transmit the frames when compressed according to a predetermined compression scheme, and a computer display coupled to the processor for displaying the estimate.

Preferably, the processor receives an indicated bandwidth characteristic of the network and the display shows a graphical comparison over time of the estimated bandwidth and the indicated bandwidth.

Preferably, the processor produces the estimate without compressing the data frames.

Preferably, the processor adds to the estimate of a first frame the bandwidth of substantially any media referenced in the first frame but not described therein.

The present invention will be more fully understood from the following detailed description of the preferred embodiments thereof, taken together with the drawings, in which:

BRIEF DESCRIPTION OF THE DRAWINGS

FIG. 4 is a table illustrating a file structure for storing a multimedia application, in accordance with a preferred embodiment of the present invention;

Attached herewith is a microfiche appendix comprising Appendix A which aids in the understanding and appreciation of one preferred embodiment of the invention shown and described herein. Appendix A forms a computer listing of a preferred software embodiment of the present invention.

DETAILED DESCRIPTION OF PREFERRED EMBODIMENTS

Figure 1:
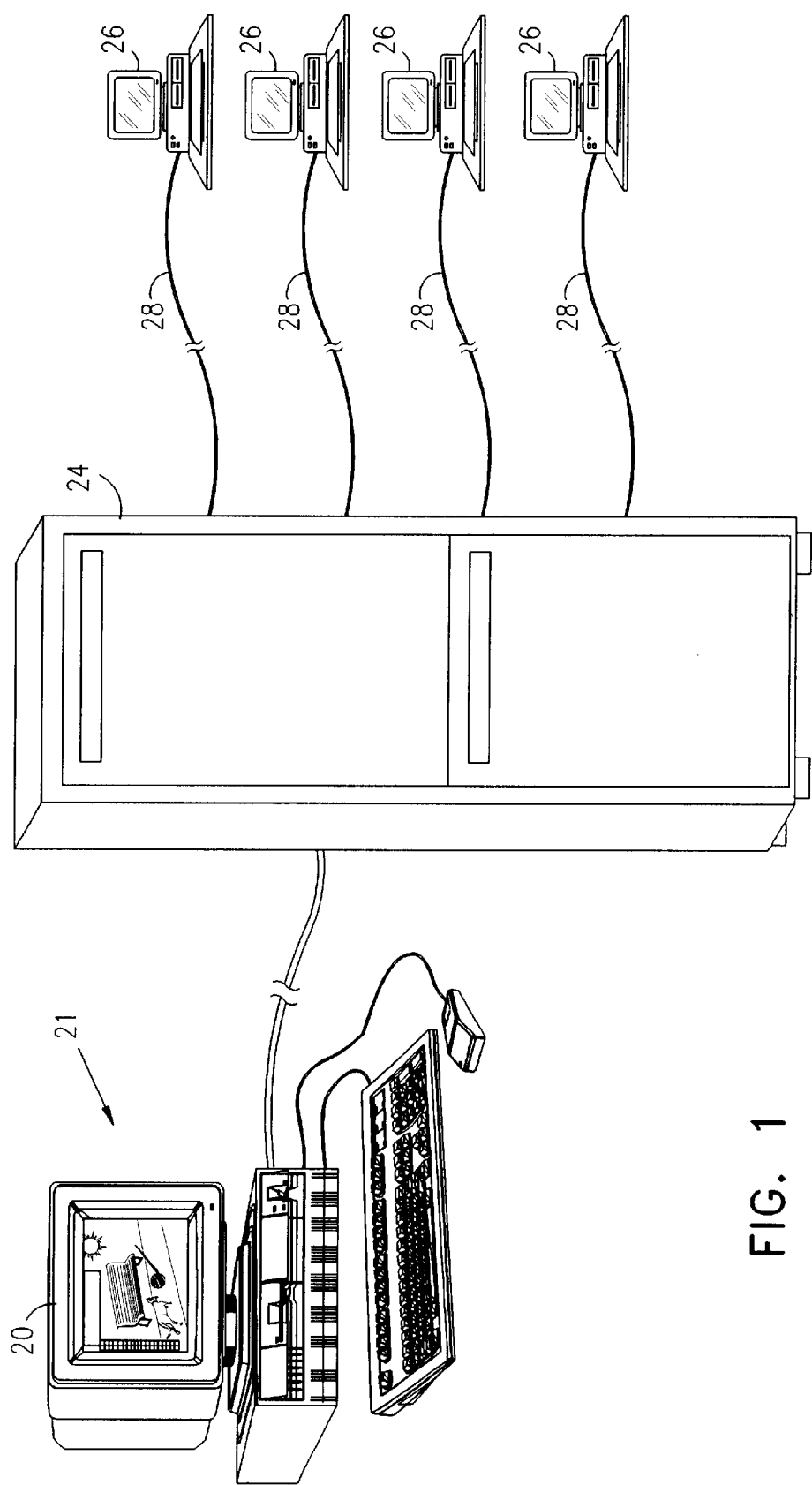
FIG. 1 is schematic illustration of a monitor screen of a computer in use with an authoring tool, in accordance with a preferred embodiment of the present invention.

FIG. 1 illustrates a screen 20 of a source media processor, preferably a computer 21 in use with software for producing multimedia applications, in accordance with a preferred embodiment of the present invention. Such software is referred to herein as an authoring tool. Screen 20 contains a view of a frame as prepared to be displayed by the authoring tool. The word "frame" as used in the present patent application refers to the total of all material displayed in a given time slot of a multimedia application. The frame may include bitmap images (including video images), vector graphic objects, text data, audio and other sensible media, as well as program scripts, as are known in the art. Therefore, in this disclosure and in the claims, the word "display" is used in the wide meaning of presenting material in any sensible form, particularly including both images and sound.

Source computer 21 may be connected to a server 24 on which a final product from computer 21 is mounted to form a web site, as is known in the art. A recipient computer 26 may connect to server 24 via public phone lines 28. Alternatively, other connection methods may be used, such as satellite or cable connections. Preferably, server 24 and computers 26 include suitable modems for the data transmission according to the connection method.

The authoring tool preferably allows preparing and importing of media as is known in the art, and described, for example, in the CorelDraw User's Manual-Version 4.0 (1993), in PCT application PCT/IB97/00573 which is assigned to the assignee of the present invention, and in U.S. Pat. No. 5,619,636 which are incorporated herein by reference. Preferably, the authoring tool allows advanced video and audio editing as described, for example, in U.S. Pat. Nos. 5,590,262 and 5,537,528 which are also incorporated herein by reference. Preferably, video and audio data externally produced are incorporated in a sequence of frames by stating a beginning frame and an end frame in which the data are to be displayed. Alternatively, the user inputs the rate of display of the data.

Preferably, each of the media is entered to the frame in a specific layer, e.g., foreground, background, etc., such that when two or more media partially or entirely occupy the same pixels, the computer determines what is to be displayed according to the layers and their transparency. A user may define each of the media as occupying a separate layer, and there is in principle no limit on the number of media or layers in any single frame.

When the entire application is completed, it is preferably compressed and stored in preparation for transmission. In order to save the time that would be required to perform the compression during production, the application is preferably stored during production in an uncompressed format, using conventional methods known in the art. An estimate of the data volume required by the application in compressed form is provided to the user, as described hereinbelow, so that the user can plan the data size and transmission rate of the application, without actually compressing the data. Only after completion of the entire application is the compression actually done.

Figure 2:
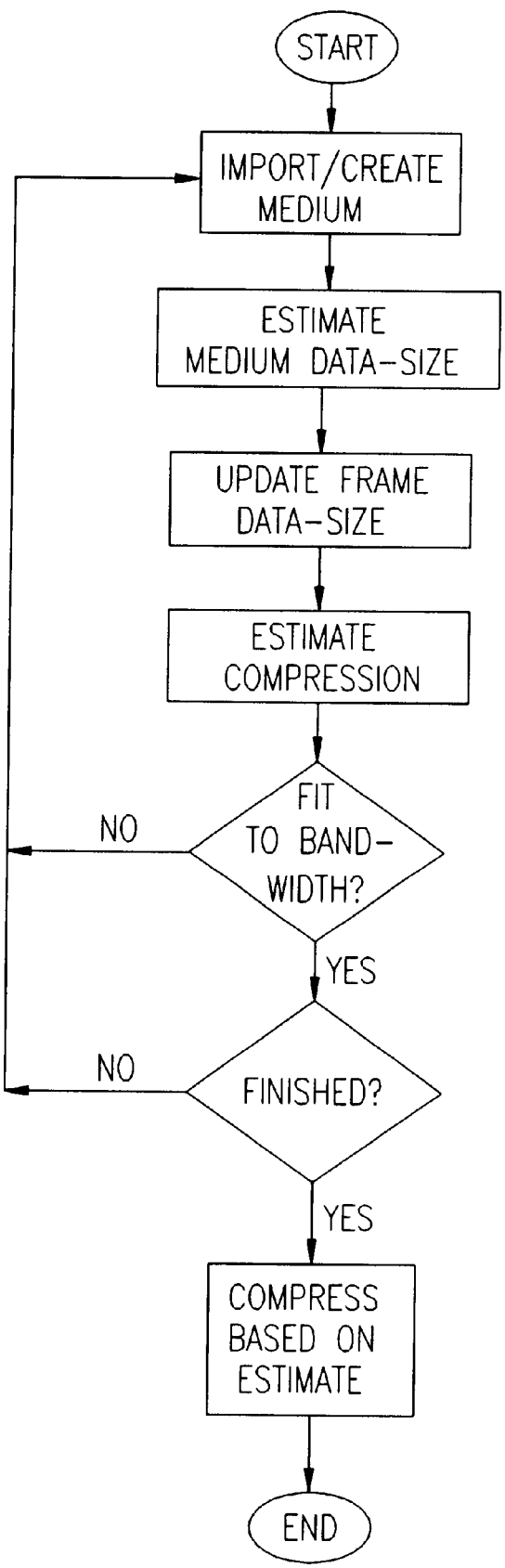
FIG. 2 is a flow chart illustrating the operation of the authoring tool, in accordance with a preferred embodiment of the present invention.

FIG. 2 is a flow chart illustrating the operation of the authoring tool, in accordance with a preferred embodiment of the present invention. Preferably, for each of the media imported or created, the authoring tool produces a quick estimate of the volume of data required to store or transmit the information in a suitably compressed file, in accordance with preferred embodiments of the present invention. Alternatively or additionally, the estimate is produced automatically periodically or upon request by the user. Preferably, during creation of images and other media, an estimate of the required data volume for the media is constantly displayed on the screen, so that a user can take the data volume and expected transmission bandwidth into account while creating the images. For example, a user may reduce slightly the size of a medium so that its coordinates occupy substantially less data volume. Preferably, the authoring tool likewise performs an estimate of the required storage or transmission volume for each frame created. Preferably, the estimate is performed when the frame is completed. Alternatively or additionally, the estimate is constantly produced and displayed during creation of the frame. Preferably, the estimate is performed by adding up the storage or transmission volume required by each of the media in the frame, together with the volume necessary for saving or transmitting properties and general information of the frame.

The estimate of the volume required for each of the media is dependent on the nature of the media. The volume required by audio and video media is preferably estimated by multiplying the current data volume of the media by an average compression ratio. Media comprising vector graphic objects are estimated according to the known amount of memory required by each vector, and therefore the estimate for vector objects is substantially accurate. Media including bitmap objects are preferably estimated by performing statistical sampling of areas of the object, and comparing the resultant statistics to known compression ratios of other, statistically similar objects. It will be appreciated by those skilled in the art, that the data volume of other media types may be estimated in similar manner, according to the above-described guidelines.

Preferably, the estimate is compared to actual required data volumes received from compression performed periodically or by user actuation. Further preferably, subsequent estimates are corrected according to the results of the actual compression.

After the application is created, as described above, the video and audio portions of the application may be transmitted either asynchronously or synchronously with the vector-based animation portions. In asynchronous transmission, the video and audio media are streamed separately from and largely independently of the animation. Since the transmission bandwidth has been taken into account in creating the application, the video and audio media will generally stream at the same rate as the animation. Intermittently, generally at predetermined points in the data streams, the recipient computer checks the timing of the video and audio media against the animation, and interrupts one or more of the media temporarily to compensate for any relative delay that has occurred. Alternatively, in synchronous transmission, the mutual synchronization of the video and audio media with the animation is continually checked, and if necessary, frames or short portions of the video and/or audio are dropped out of the transmission in order to maintain proper synchronization, in the event that the bandwidth is smaller than had been taken into account in authoring the application.

Figure 3:
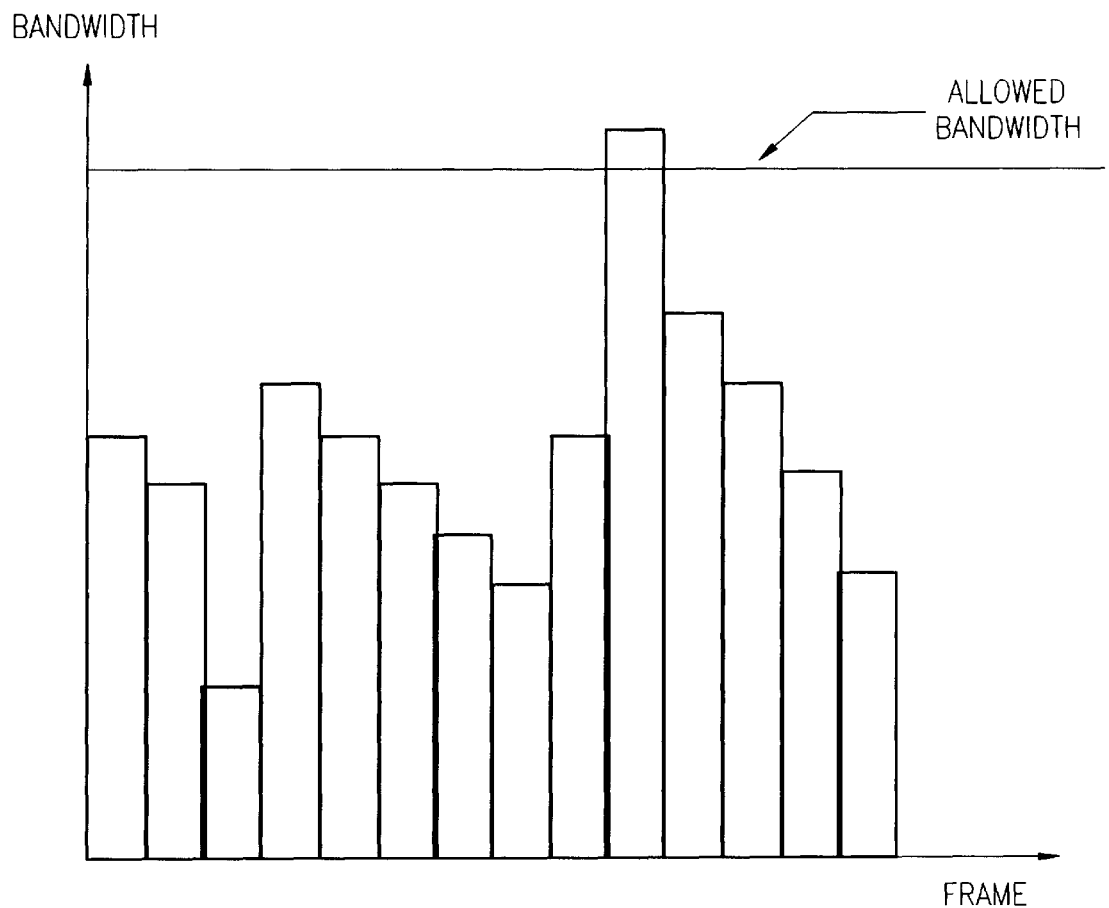
FIG. 3 is a graph showing an estimated bandwidth compared to a predetermined bandwidth of a multimedia application, in accordance with a preferred embodiment of the present invention.

FIG. 3 is a graph of an estimated bandwidth compared to a predetermined bandwidth of a channel, such as the Internet, over which a multimedia application is to be transmitted, in accordance with a preferred embodiment of the present invention. Preferably, the estimate of the transmission bandwidth of each frame is calculated based on the volume of the frame's data, as described above, and the frame-per-second display rate. Preferably, the estimate for each frame may be calculated for either in-stream or worst-case. For in-stream estimates the required bandwidth of media described in previous frames is not included in the estimate. In worst-case estimate each frame is estimated as being transmitted alone and therefore the required bandwidth of media described in previous frames is added to the bandwidth of the media fully described in the estimated frame. Preferably, in-stream estimates may adjust the estimate of some frames according to the required bandwidth of previous frames. A frame which is normally transmitted after a frame which has a small required bandwidth will be given a reduced estimate from which the data transmitted during time assigned to previous frames, is subtracted.

The bandwidth is preferably displayed on a histogram for each frame. Preferably a predetermined desired bandwidth is displayed on top of the histogram for comparison. Those frames which have a bandwidth larger than the desired bandwidth may be compressed at a larger compression rate to reduce the bandwidth, so as to minimize the difference between the desired and actual bandwidth, or elements of such frames may be removed. Alternatively, a portion of a frame having an excessive estimated data volume may be assigned to be pre-transmitted during a time slot allocated to a preceding frame, whose estimated data volume is less than the maximum determined in accordance with the bandwidth. Preferably, after compression the histogram is updated according to the actual volumes of the frames after compression. When the user finishes preparing the multimedia application, the contents are compressed and stored and/or transmitted.

FIG. 4 illustrates the structure of a file 100 for storing and transmitting a multimedia application, in accordance with a preferred embodiment of the present invention. File 100 includes a header 102 which contains general data about the file, a direct access table 104 pointing to descriptions of frames and media in the file, and segments 120, 122, 124 and 126 containing data describing the frames and their sub-elements for each frame in the described application. Preferably, there is substantially no limit on the number of frames in the application. An out-of-flow media description section 129 is preferably situated at the end of file 100, listing descriptions of media which are not associated with any specific frame. Such media generally arise in interactive applications in response to actions of a user. Alternatively or additionally, the descriptions of out-of-flow media are placed between the frames at a convenient location.

Figure 5A:
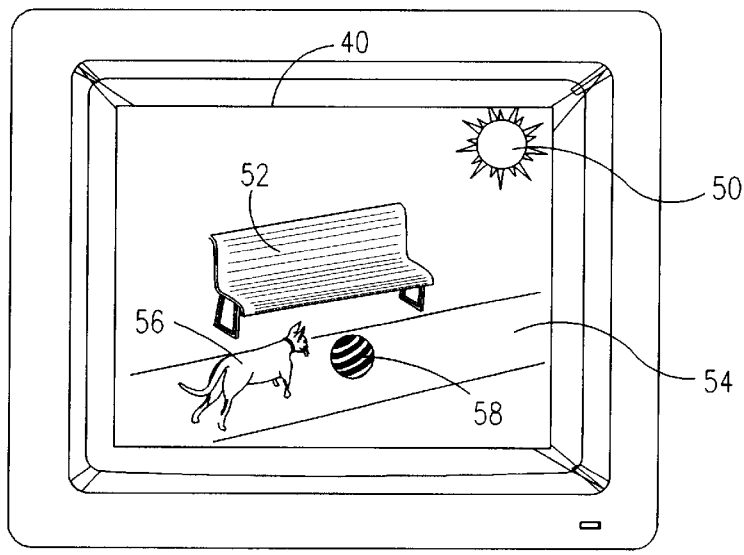
FIGS. 5A–5C are schematic illustrations of a computer monitor screen displaying images generated by a multimedia application, in accordance with a preferred embodiment of the present invention.
Figure 5B:
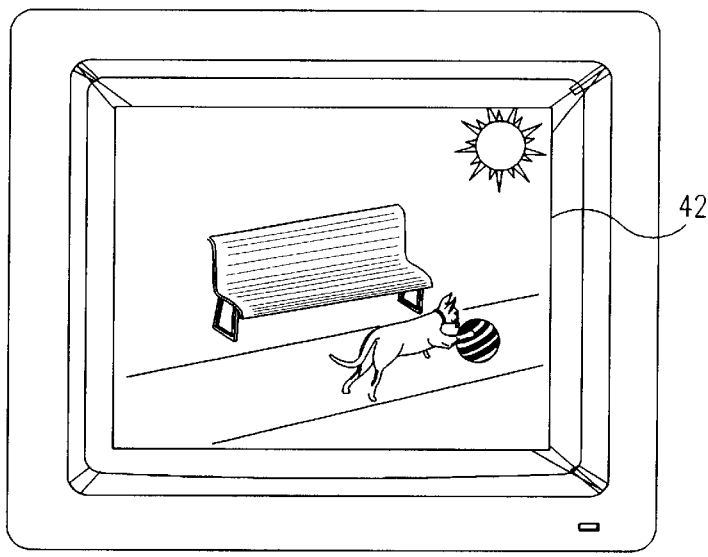
Figure 5C:
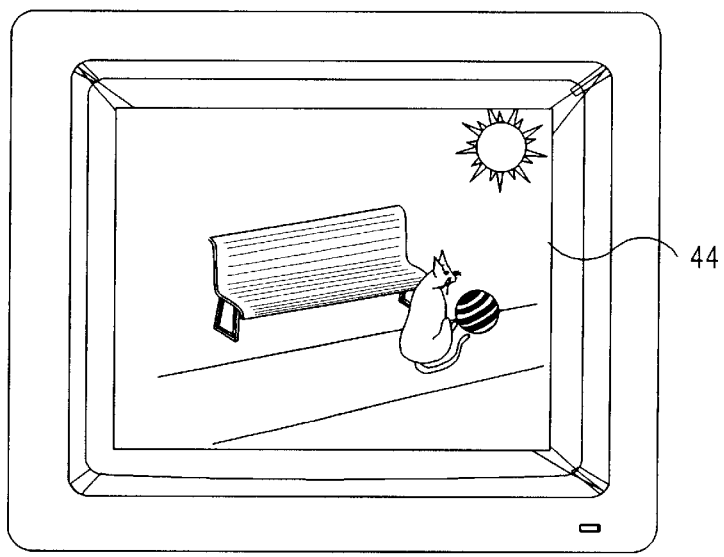

For illustration purposes, FIGS. 5A–5C show a preferred embodiment of the present invention, described with reference to three frames 40, 42 and 44, respectively. Frame 40 includes various media including a sun 50, a bench 52, a path 54, a cat 56 and a ball 58.

Figure 6A:
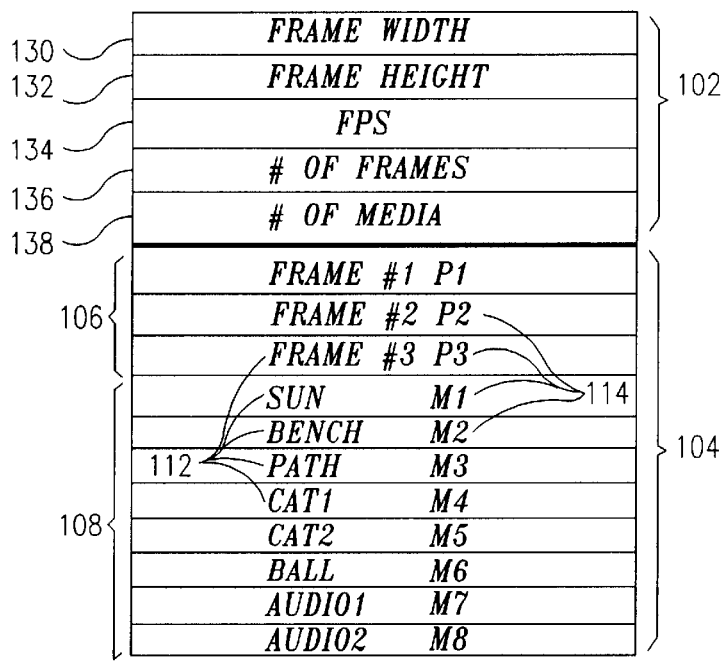
FIGS. 6A–6D are details of the file structure of FIG. 4, describing the multimedia application of FIGS. 5A–5C, in accordance with a preferred embodiment of the present invention.

FIGS. 6A–6D show details of file 100, shown overall in FIG. 4, used in generating the multimedia application of FIGS. 5A–5C, in accordance with a preferred embodiment of the present invention. As shown in FIG. 6A, header 102 includes general information about the file and/or the application, such as width 130 and height 132 of the frames, the number of frames displayed per second (FPS) 134, and the numbers of media 138 and frames 136 in the file. Other data may be included in the header, such as a file identification code. For purposes of illustration, the following is a table of data in header 102, together with required storage space for each entry in the table, in accordance with a preferred embodiment of the present invention. The significance of the fields in the table is explained herein, or will be generally understood by one skilled in the art.

| Field | Num. of Bytes |
| --- | --- |
| File version | 2 |
| Movie loop | 1 |
| Wait for click | 1 |
| Script active | 1 |
| Anti alias | 1 |
| Control panel visible | 1 |
| Panel X | 2 |
| Panel Y | 2 |
| Movie width | 2 |
| Movie height | 2 |
| Movie BG color | 1 |
| FPS | 1 |
| Sound volume | 1 |
| Stage tile | 1 |
| Number of casts | 2 |
| Number of frames | 2 |
| Number of FrameScript 1 | 1 |
| Number of LayerScript 1 | 1 |
| Number of FrameScript 2 | 1 |
| Number of LayerScript 2 | 1 |
| Number of Plots | 1 |
| Number of video | 1 |
| Number of real audio | 1 |

Table 104 preferably includes two lists, a frame list 106 and a media list 108. For each frame and medium, there is an entry in table 104 including an ID code 112 and a pointer 114. List 108 includes pointers to media of various types including casts, plots, video movies and real audio. Preferably, list 108 also includes pointers to layer and frame scripts. These scripts include sets of actions performed on the frame or layer before it is displayed, thus allowing a simple and low volume method of manipulating the contents of a layer or frame.

Preferably, the data sizes of pointers 114 are adjusted according to the total size of file 100, so that the pointers themselves take up no more than a minimum practical data volume. In compression of the file, the actual compressed file size is preferably used in determining the data volume for this purpose. Alternatively or additionally, an estimate of the size of the file is prepared, as described above with reference to FIG. 2, to aid in determining what pointer data sizes to use. Thus, if file 100 is smaller than 256 bytes, pointers 114 are one byte long. If file 100 is larger than 256 bytes but smaller than 64 Kbytes, pointer 114 is two bytes long. If file 100 is larger than 64 Kbytes but still smaller than 16 Mbytes, pointer 114 is three bytes long. For larger files, pointer 114 is adjusted accordingly. In a preferred embodiment of the present invention, large files are broken up into smaller files, so that smaller pointers may be used.

Use of table 104 to reference segments within file 100 allows large saving in the size of the file and in transmission time, as will further be described. It also allows specific frames or media in file 100 to be randomly accessed and transmitted, by selecting pointers 114 associated with the frames or media. Thus, rather than having to transmit all of file 100 at once to the destination computer before the application can run on the destination computer, as is practiced in the art, it is generally sufficient to transmit header 102 and table 104. Thereafter, frames 120, 122, 124, etc., are transmitted and run on the destination computer in any desired order, based on selection of appropriate pointers 114 at the destination computer.

Figure 6B:
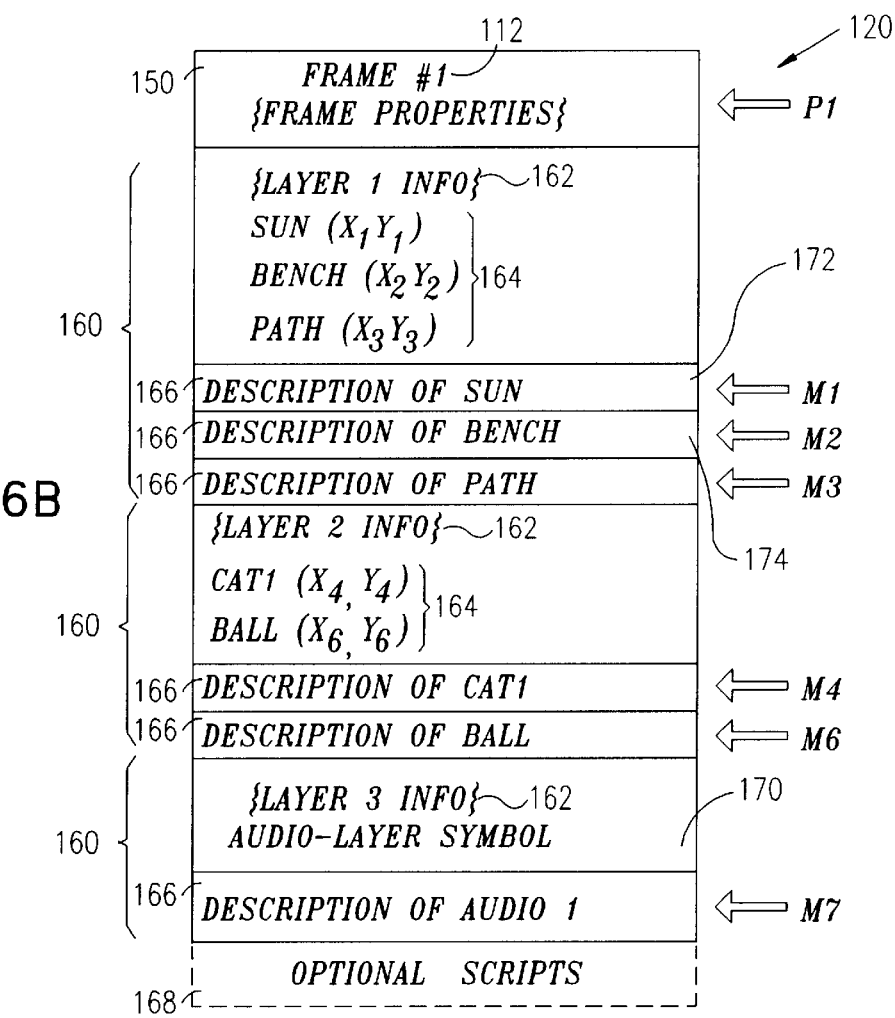

FIG. 6B shows details of a segment 120 describing frame 40 of FIG. 5A, in accordance with a preferred embodiment of the present invention. Segment 120 comprises a frame header 150, which preferably includes frame ID code 112 and other frame properties. In an exemplary embodiment, the frame properties include the number of layers in the frame, sound properties, and a script type flag. Preferably, if the script type flag is not zero, a script ID is also included. For each layer in frame 40, there is a layer segment 160 including a list 162 of the layer's properties, a coordinate list 164 for visual media, and description data sections 166 for each of the media in the layer.

List 162 includes properties of the layer, such as, coordinates of the layer relative to the frame, ink, layer ID, etc. Like substantially all the other property lists in file 100, list 162 is preferably dynamically sized. The information in list 162 is preferably grouped in blocks, and each block is incorporated in the list corresponding to a particular layer only if needed for the particular layer. A first block in list 162 includes the properties of the layer that are defined for every layer, such as ID, coordinates, ink, and a "mode" designator. Preferably, the mode designates whether the layer is scaleable and/or includes one or more scripts, and accordingly whether list 162 includes additional information such as script IDs and scaling ratios.

Alternatively or additionally, list 162 includes only those properties which are different from the default, along with identification of the properties. Further alternatively, the list is organized such that properties which are seldom used are situated at the end of the list and the list is truncated of unused properties, i.e., properties set to the default. Thus, in this case there is no need to list the identification of the properties, and the data volume required by the layer is reduced. Preferably, for each file the property list is reorganized according to use-statistics of the properties.

In a preferred embodiment of the present invention, visual elements of frame 40, such as sun 50 and bench 52, are respectively associated with pointers 114 in table 104, in order to allow interactive flow control of animation elements. When a user of the destination computer selects one of the elements, for example, by pointing at it with the mouse, the destination computer checks whether the corresponding frame is already stored in the destination computer. If the frame has not been received yet, the corresponding pointer is transmitted back to the source computer or server, which then transmits frames from file 100 indicated by the selected pointer.

Figure 7:
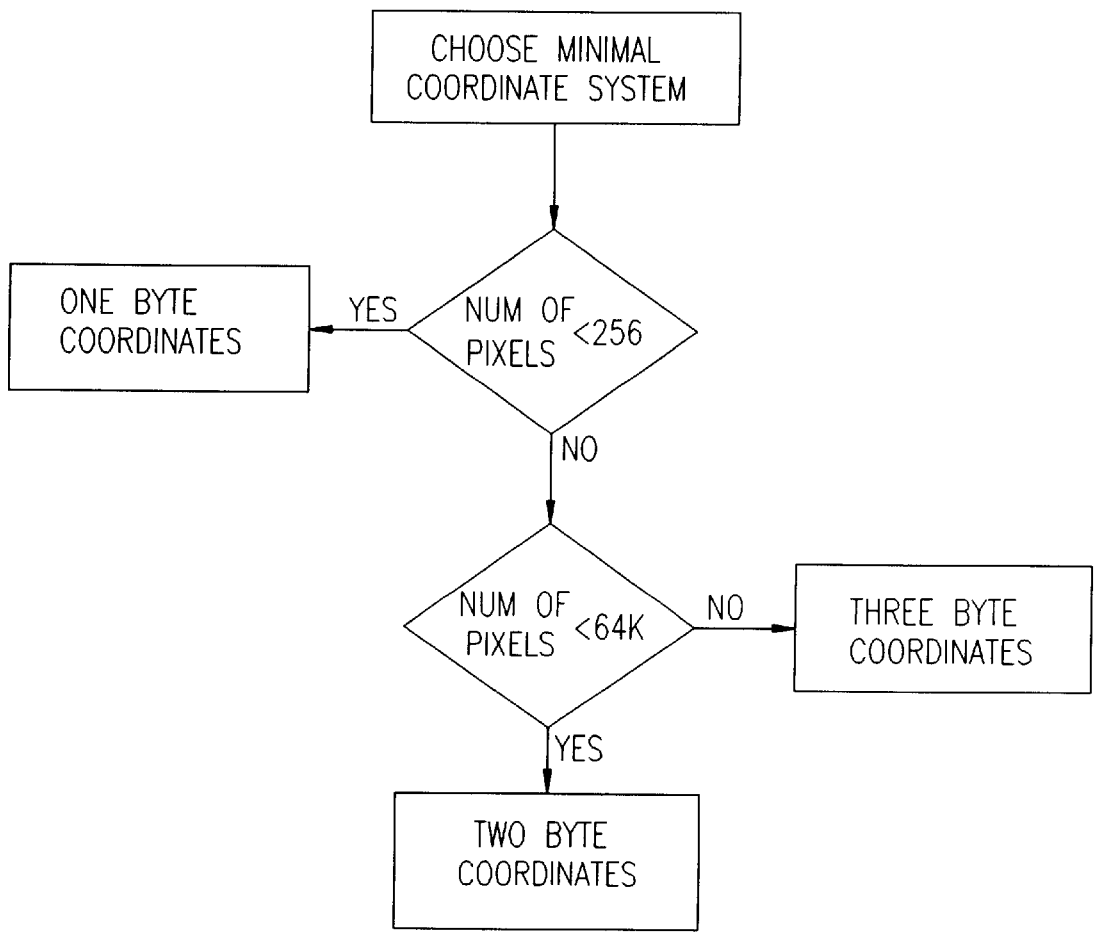
FIG. 7 is a flow chart illustrating a method for choosing the data-size of coordinates, in accordance with a preferred embodiment of the present invention.

FIG. 7 is a flow chart illustrating a method of choosing the data-size of the coordinates, in accordance with a preferred embodiment of the present invention. Coordinate list 164 states the coordinates of the media within the respective layer. These coordinates are listed with respect to the layer, and their data size is normalized according to the number of pixels in the layer. If the layer has less than 256 pixels, the coordinates take up one byte each, while for layers with more than 256 pixels but less than 64K pixels two bytes are preferably used for each coordinate. Alternatively or additionally, the coordinates occupy together a whole number of bytes so that when two dimensional coordinates are used, each coordinate may occupy, for example, 12 bits.

Preferably, all coordinates listed in file 100 are normalized in a manner similar to that described above. Further preferably, elements such as layers, media and objects are set to have a small size preferably smaller then 256 pixels such that the data size of coordinates describing the elements is one byte. In some preferred embodiments of the present invention, layers are assigned an intermediate size between the size of the frame in which they are located and the size of the media they contain. Thus, the data size of the coordinates are smaller than would be required if the layers were of the size of the frame. Preferably, other elements may be given intermediate sizes in a similar manner. Further preferably, data elements additional to frames, layers and media listed above are defined to form a larger hierarchy allowing use of coordinates of smaller data sizes.

Returning to FIG. 6B, it is noted that a layer 170 is an audio layer, and therefore includes no coordinate list. Instead, the layer includes a symbol designating the fact that it is an audio layer. In alternative embodiments of the present invention, audio media are included in layers of visual data, and their audio nature is apparent from their contents.

Data sections 166 in frame 120 include descriptions of the media in the respective layer 160 in which they are listed. Referring also to FIG. 5A, sun 50 is described in section 172, bench 52 is described in section 174, etc. The description may include any of the description methods known in the art, including, but not limited to, a list of vector graphic objects, compressed bitmap types, and compressed video objects. Coordinate list 164 may include functions which are applied to the vector media to transform the media to their final display form.

Vector graphic objects preferably comprise a list of graphic shapes denoted by their extreme points, as described, for example, in the above-mentioned U.S. Pat. No. 5,619,636, or as is otherwise known in the art.

Compressed video may include, for example, a reference to an earlier described similar image and the differences between it and the present image. The similar image may be referenced by its ID or directly by a pointer to it.

As described above with reference to FIG. 7, coordinates used in descriptions in any of the description methods are normalized to the minimal size possible. Preferably, a coordinate system is chosen as the smallest possible system still including all points which there may be a need to reference in description of the media. Preferably, in description of media the coordinate system chosen is of the size of the described media.

Preferably, each segment describing a frame, such as segments 120, 122, 124 and 126, is accompanied by a script segment 168. Preferably, frames with scripts have a flag which indicates which types of script or scripts they include. Script segment 168 may include frame scripts, simple layer scripts and more advanced layer scripts. Frame scripts pertain to the entire frame and include data such as URL options, current frame, destination frame, cursor details, etc., according to the type of the specific script. Preferably, a flag at the beginning of the script data designates the type of script.

Preferably, the layer scripts are referred to in lists 162. Alternatively or additionally, the number of scripts in the frame is listed in the frame segment which includes the general information pertaining to the frame. The layer scripts include simple scripts which operate predetermined actions selected by the user from a bank of given scripts, and advanced scripts which allow inclusion of programmer-written JAVA scripts.

Figure 6C:
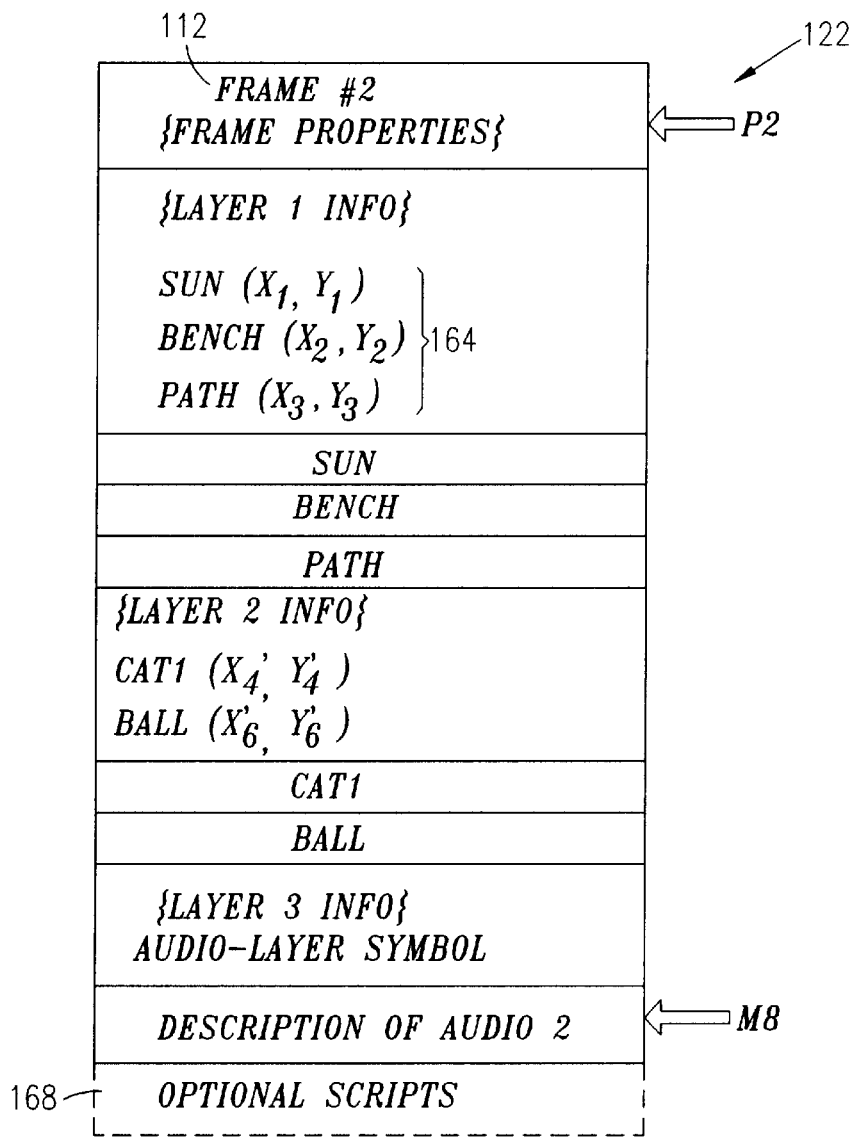
Figure 6D:
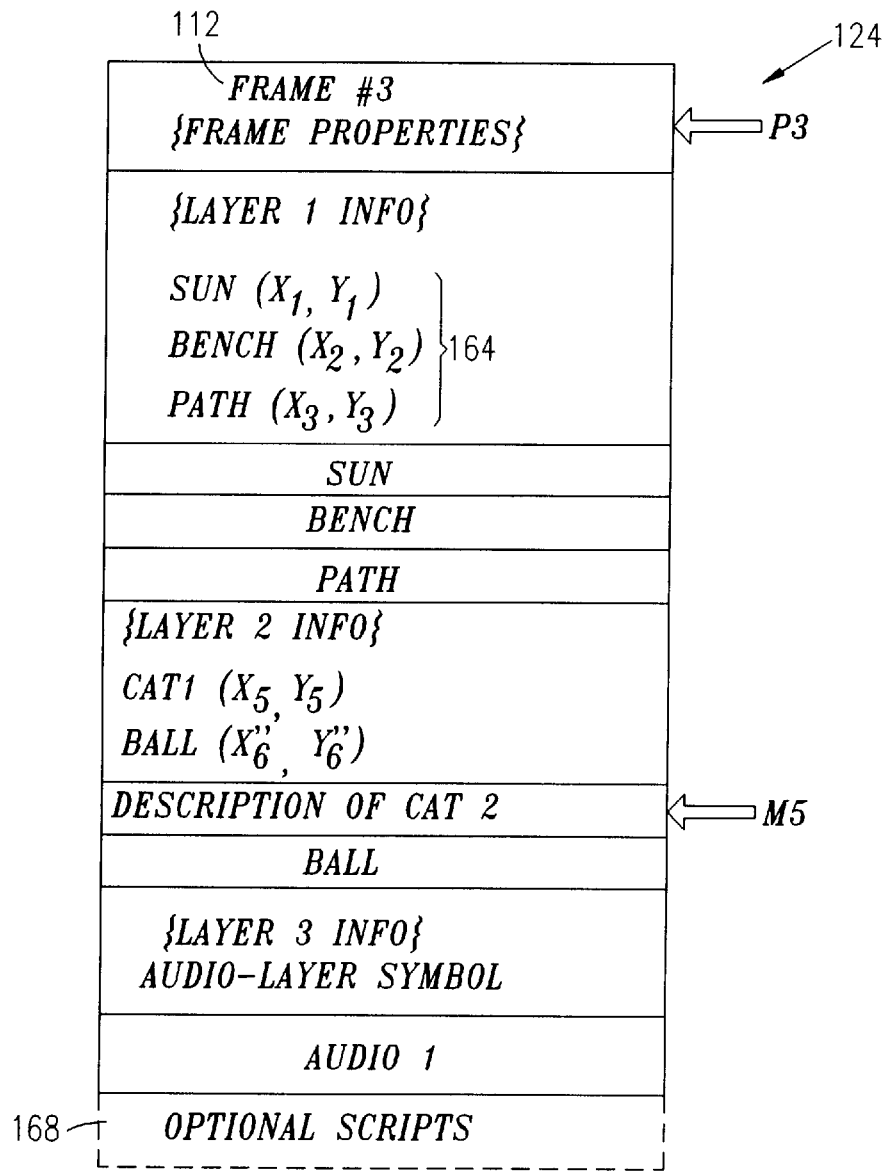

It will be appreciated by those skilled in the art, that although in FIGS. 6B–6D, each layer is followed by descriptions of and/or pointers to the media in the layer, other methods of organizing the data are possible. Specifically, the descriptions of the media in each frame may appear together after the data pertaining to the layers in the frame.

FIG. 6C shows details of a segment 122 describing frame 42 of FIG. 5B, in accordance with a preferred embodiment of the present invention. The structure of segment 122 is similar to that of segment 120. However, those media which were described in segment 120 are only referenced in segment 122, possibly including changes in the media coordinates, thus saving considerable data volume in the file. FIG. 6D shows details of a segment 124 describing frame 44 of FIG. 5C, in accordance with a preferred embodiment of the present invention.

Media which are described in section 166 by a bitmap are preferably compressed according to a discrete cosine transform (DCT), most preferably in accordance with the JPEG standard. Preferably, before the bitmap is compressed, it is filtered by a low pass filter, for example, by convolution with a kernel given by:

$$\frac{1}{20} \cdot \begin{bmatrix} 1 & 2 & 1 \\ 2 & 8 & 2 \\ 1 & 2 & 1 \end{bmatrix} \quad (1)$$

The filter of equation 1 has a blurring effect on the bitmap image which in most cases is hardly noticed by a human eye, particularly at the relatively low image resolution available in most Internet transmissions. The inventors have found that applying this filter to a bitmap before performing JPEG transform reduces the resulting file size by a factor of between two to four.

Preferably, the user may define media or parts of media which are not filtered, for example because they have sharp changes and detail in their images, over a relatively small area. Preferably, the user first performs filtering and transform of all the media described by bitmaps, and according to the results defines areas which are not to be blurred. Further preferably, the bitmap received after filtering and transforming is automatically compared to the original bitmap and areas which have seriously altered are not filtered in a final compression stage.

In preferred embodiments of the present invention, the compression described above is applied via methods other than the specifically designed authoring tool described above. In a preferred embodiment of the present invention, an automatic translation tool translates multimedia applications from various standard formats to the compressed format described above.

Figure 8:
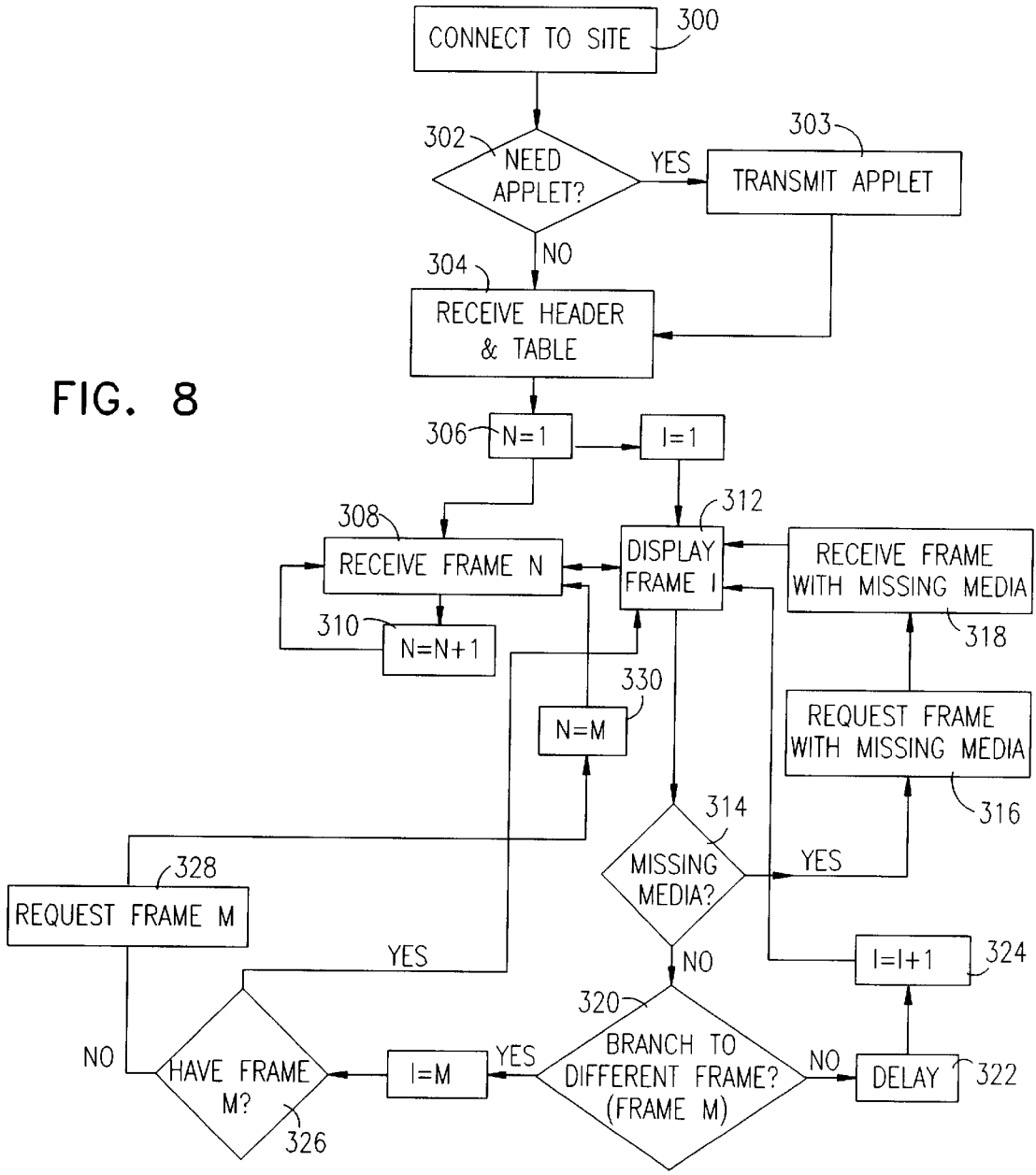
FIG. 8 is a flow chart illustrating transmission and reception of a multimedia application, in accordance with a preferred embodiment of the present invention.

FIG. 8 is a flow chart illustrating a method of transmitting a multimedia application from server 24 to recipient computer 26, in accordance with a preferred embodiment of the present invention. After computer 26 connects to server 24 as designated in block 300, computer 26 notifies server 24 if it needs a decompression applet. The applet is used to decompress file 100, and is preferably written in the JAVA language. Preferably, the applet requires less than 100 Kbytes of storage space and is transmitted within 20 seconds from connection. Preferably, computer 26 stores in its memory a copy of the applet, and thus there is no need to send the applet each time computer 26 connects to server 24. Further preferably, computer 26 sends a short signal to server 24 upon connection, notifying that it has a copy of the applet. The notification is either responsive to an inquiry from server 24 as shown in block 302, or the applet is transferred automatically unless computer 26 requests otherwise.

When computer 26 has the applet, header 102 and table 104 of file 100 are transmitted thereto, as indicated in block 304. The frames are then sequentially transmitted, as indicated in blocks 306, 308 and 310 as long as the communication channel is free of other use, and no special requests are received.

As the frames are received by computer 26, as indicated in block 312, they are displayed according to the frames-per-second rate which appears in header 102. Computer 26 is delayed for a required display time, if necessary, and then moves to the next frame, as indicated in blocks 322 and 324.

If during display of a frame, a required medium is found to be in a frame (J) which was not received yet, as indicated in block 314, a request for frame J is sent to server 24, as indicated in block 316, and the data receiving indicated in block 308 is interrupted to receive frame J, as indicated in block 318. After frame J is received, the sequence of data transfer in block 308 is resumed, as is the display in block 312. In an alternative embodiment, the absence of the media in frame J is recognized when the frame which is missing the media, is received in block 308, and frame J is immediately ordered so as to minimize the chance of display delay due to missing data. It will be understood that when the frames are transmitted and displayed in the order in which they are stored in file 100, there will generally not be media absent. But when the frames are transmitted in another order in response to a request from computer 26, as enabled by the present invention, absent media must sometimes be transmitted as described above.

If a frame which has not arrived yet is required, as indicated in block 320, either by the multimedia application itself or by an external user request, a request for the frame is sent to server 24, as indicated in block 328. The frame is preferably identified either by its ID or by its pointer address in table 104. Server 24 consequently begins transmitting frames starting from the new frame requested by the user, and typically continuing in order through the file. When the end of the file is encountered server 24 returns to transmit those frames which were not transmitted yet. Alternatively, a certain number of frames are requested and after these frames are received server 24 returns to transmit frames from the point where it was interrupted. Preferably, if the transmission rate is faster than the display rate of the file, computer 26 does not stop receiving the file and continues accumulating and storing the received data.

The incentive for the branch in the display indicated in block 320, may arise, for example, by a user of computer 26 marking a frame in the middle of a tutorial. When the user returns to re-run the tutorial, a request to skip to the marked frame is passed to server 24. The user continues from this frame without having to wait for the transfer of the entire beginning of the application. Furthermore, as noted above, the multimedia application may include frames which are displayed randomly rather than sequentially. In this case, table 104 is consulted, and computer 26 requests data transfer to proceed at the desired frame.

It is noted that although the primary incentive for the methods of compression and random-access transmission described above is to facilitate multimedia communications over slow-rate telephone lines, the principles of the present invention may also be advantageously applied in transmitting images and data for other purposes, over both narrow- and wide-band communication channels.

A preferred method for constructing and playing real-time multimedia applications in accordance with a preferred embodiment of the present invention is now described:
 a) Set up a computer environment with the Windows 95 operating system and the "Asymetrix toolbox 4.0" software;
 b) Load the executable instructions of Appendix A into a file in the computer's memory or the computer's hard disk;
 c) Decompress the contents of the file using "PKUNZIP v. 2.0G" software available from PKWare, Inc.;
 d) Run "EMBLAZE.EXE" to create a multimedia application file having a ".BLZ" file name extension;
 e) Place the created ".BLZ" multimedia application file along with the files having a ".CLASS" file name extension onto a World-Wide-Web-capable Internet server; and
 f) Connect to the server from a computer which has Netscape Navigator 3.0 or any other Java enabled browser to view the multimedia application.

It is appreciated that the particular embodiment described in the Appendix is intended only to provide an extremely detailed disclosure of the present invention and is not intended to be limiting.

It will be appreciated that the preferred embodiments described above are cited by way of example, and the full scope of the invention is limited only by the claims.

What is claimed is:

1. A method for conveying a multimedia sequence from a source computer to a destination computer, comprising:
 providing an ordered series of data frames at the source computer, each data frame corresponding to an image in the sequence and comprising data representing one or more media associated with the image;
 producing a table including pointers, each pointer associated with one frame in the series;
 transmitting the table to the destination computer; and
 responsive to selection of one of the pointers in the table, transmitting at least a sub-series of the series of data frames, said sub-series beginning with the frame with which the selected one of the pointers is associated.

2. A method according to claim 1, wherein producing the table comprises defining pointers having a data size normalized to the size of a data file containing the series of frames.

3. A method according to claim 2, wherein defining the pointers comprises defining pointers of a minimal size required to distinctly address every frame in the file.

4. A method according to claim 3, wherein defining the pointers comprises defining one-byte pointers when the ordered series comprises less than 256 bytes.

5. A method according to claim 4, wherein defining the pointers comprises defining two-byte pointers when the ordered series comprises less than 65,536 bytes.

6. A method according to claim 1, and comprising transmitting at least an initial frame in the series to the destination computer and associating one or more of the pointers in the table with the initial frame, wherein transmitting the sub-series comprises transmitting the sub-series responsive to a selection made with respect to the initial frame.

7. A method according to claim 1, wherein producing the table comprises producing pointers which indicate respective media in one or more of the frames.

8. A method according to claim 7, wherein transmitting the sub-series responsive to selection comprises invoking the media indicated by a selected pointer.

9. A method according to claim 1, wherein providing an ordered series of frames comprises creating a first frame comprising data representing an object in the corresponding image.

10. A method according to claim 9, wherein providing the ordered series comprises creating additional frames after the first frame, which include frame data indicative of the coordinates of the object.

11. A method according to claim 10, wherein creating the additional frames comprises creating additional frames which include a pointer to data representing the object in the first frame.

12. A method according to claim 10, wherein creating the additional frames comprises creating additional frames which include an ID corresponding in the table to a pointer to the data representing the object in the first frame.

13. A method according to claim 1, wherein transmitting the table comprises transmitting over a computer network.

14. A method according to claim 1, wherein transmitting the table comprises transmitting over the Internet.

15. A method according to claim 13, and comprising transmitting to the destination computer a JAVA applet operative to produce sensible material from the ordered series.

16. A method according to claim 1, wherein creating the series comprises creating data objects representing audio data.

17. A method according to claim 1, wherein creating the series comprises creating data objects representing visual data.

18. A method according to claim 17, wherein creating the data objects comprises creating at least some segments which comprise vector objects.

19. A method according to claim 17, wherein creating the data objects comprises creating at least some segments which comprise compressed bitmaps.

20. A method according to claim 1, wherein providing the ordered series of data frames comprises creating coordinates of objects within the frame, relative to sub-elements of the frame, wherein creating coordinates of objects comprises normalizing the data size of the coordinates responsive to pixel dimensions of the sub-elements.

21. Apparatus for conveying a multimedia sequence over a network to a destination computer, comprising:
 a media processor, coupled to the network, which provides an ordered series of data frames, each frame corresponding to an image in the sequence, and produces a table including pointers, each pointer respectively associated with one frame in the series, wherein the processor transmits the table to the destination computer and responsive to selection of one of the pointers in the table, transmits at least a sub-series of the ordered series of data frames, said sub-series beginning with the frame with which the selected one of the pointers is associated.

22. Apparatus according to claim 21, wherein the pointers have a data size normalized to the size of a data file containing the series of frames.

23. Apparatus according to claim 22, wherein the pointers have a minimal size required to distinctly address every frame in the file.

24. Apparatus according to claim 23, wherein the pointers have a size of one-byte when the ordered series comprises less than 256 bytes.

25. Apparatus according to claim 23, wherein the pointers have a size of two bytes when the ordered series comprises less than 65,536 bytes.

26. Apparatus according to claim 21, wherein the processor transmits at least an initial frame in the series to the destination computer and transmits the sub-series responsive to a selection made with respect to the initial frame.

27. Apparatus according to claim 21, wherein the table comprises pointers which indicate respective media in one or more of the frames.

28. Apparatus according to claim 27, wherein the processor transmits the sub-series responsive to invoking the media indicated by a selected pointer.

29. Apparatus according to claim 21, wherein the ordered series of frames comprises a first frame including data representing an object in the corresponding image and additional frames after the first frame, which include frame data indicative of the coordinates of the object.

30. Apparatus according to claim 29, wherein the data indicative of the description of the object comprises a pointer to data representing the object in the first frame.

31. Apparatus according to claim 29, wherein the data indicative of the description of the object comprises an ID corresponding in the table to a pointer to the data representing the object in the first frame.

32. Apparatus according to claim 21, wherein the network comprises the Internet.

33. Apparatus according to claim 32, wherein the processor transmits to the destination computer a JAVA applet operative to produce sensible material from the ordered series.

34. Apparatus according to claim 21, wherein the series comprises data objects representing audio data.

35. Apparatus according to claim 21, wherein the series comprises data objects representing visual data.

36. Apparatus according to claim 35, wherein the data objects comprise at least some segments which comprise vector objects.

37. Apparatus according to claim 35, wherein the data objects comprise at least some segments which comprise compressed bitmaps.

38. Apparatus according to claim 21, wherein the ordered series of data frames comprises coordinates of objects within the frame, relative to sub-elements of the frame, and wherein the data size of the coordinates of the objects are normalized responsive to pixel dimensions of the sub-elements.

* * * * *